G. L. MANSFIELD.
DUST GUARD FOR JOURNAL BOXES.
APPLICATION FILED JUNE 4, 1908.
911,313.
Patented Feb. 2, 1909.
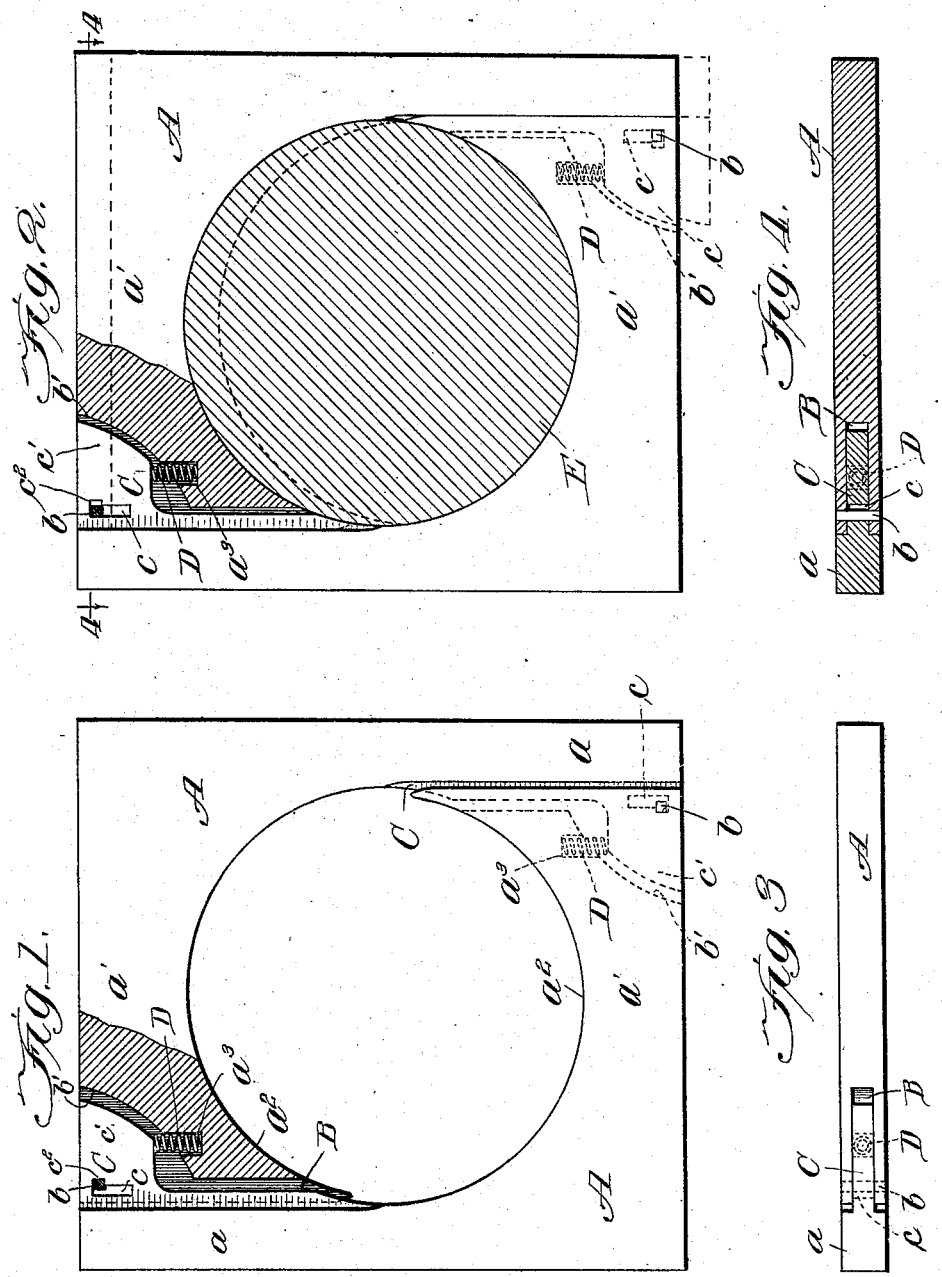
Witnesses:
Harry S. Gaither
Ruby V. Nash
Inventor:
George L. Mansfield
by Walter H. Chamberlin
Att'y

UNITED STATES PATENT OFFICE.

GEORGE L. MANSFIELD, OF CHICAGO, ILLINOIS.

DUST-GUARD FOR JOURNAL-BOXES.

No. 911,313.  Specification of Letters Patent.  Patented Feb. 2, 1909.

Application filed June 4, 1908. Serial No. 436,573.

*To all whom it may concern:*

Be it known that I, GEORGE L. MANSFIELD, a citizen of the United States, residing at Chicago, county of Cook, State of Illinois, have invented a certain new and useful Improvement in Dust-Guards for Journal-Boxes, and declare the following to be a full, clear, and exact description of the same, such as will enable others skilled in the art to which it pertains to make and use the same, reference being had to the accompanying drawings, which form a part of this specification.

My invention relates to devices for preventing the passage of dust to the interior of journal boxes particularly of railroad cars and other vehicles, and it has for its object to improve such devices and to make the application thereof easy and convenient.
In the most satisfactory forms of dust guards there are usually a plurality of relatively movable sections so arranged as to surround a central opening for receiving the shaft or axle, means being provided for forcing the sections inwardly so as to maintain them in close engagement with the shaft or axle even after wear occurs. Because of this provision for effecting automatic adjustment to compensate for wear, the openings in the guards before the guards are placed in position will of course be of minimum size and smaller than the axles or shafts to which the guards are to be applied, so that it is necessary for the workmen to force the sections out of the positions which they tend to occupy and thereby make the openings large enough to admit the axle.

Viewed in one of its aspects the present invention may be regarded as comprising a dust guard wherein the sections will be automatically latched in such relative positions as to leave the axle opening sufficiently large to admit the axle upon the mere drawing apart of the sections by the workman before he places the guard in the journal box.

Where the dust guard sections are locked in extended positions the utility of the guard may be entirely destroyed through carelessness on the part of the workman in failing to unlock the sections after the axle has been put in place and thereby permit the sections to spring against and bear upon the axle.

Viewed in a further aspect my invention may be regarded as comprising a novel form of dust guard wherein the sections, after they have been locked or latched in extended positions so as to afford a large axle opening, will be automatically unlatched or tripped upon the insertion of the axle or shaft through the guard, thereby avoiding the necessity for reliance upon the carefulness or attention of the workman when placing the guard in position.

Viewed in a further aspect my invention may be regarded as comprising a dust guard which is simple in construction, efficient in operation, and which may be readily applied by even unskilled workmen.

The various features of novelty whereby my invention is characterized will be hereinafter pointed out with particularity in the claims; but for a full understanding of my invention in its various aspects and of its object and advantages reference may be had to the following detailed description taken in connection with the accompanying drawing, wherein:

Figure 1 is a side view of a preferred embodiment of my invention, a portion being broken away to more clearly show parts normally hidden, the guard being ready to be inserted in a journal box; Fig. 2 is a view similar to Fig. 1 showing, however, the condition of the parts after an axle or shaft has been inserted, and showing also in dotted lines the ultimate positions of the parts following wear; Fig. 3 is a plan view looking at the upper edge of Fig. 1; and Fig. 4 is a section taken on line 4—4 of Fig. 2.

In the drawing my invention is illustrated as embodied in a dust guard composed of two similar substantially L-shaped members so shaped that when they are assembled together they inclose a circular opening and the detailed description, for the sake of simplicity and brevity, will be confined to this one form. I desire to have it clearly understood, however, that my invention is not limited in its application to this particular type of guard.

Referring to the drawing, A, A represent two similar L-shaped sections, the long arm $a$ of each of the sections normally resting against the end of the short arm $a'$ of the other section. The upper edge $a^2$ of each of the short arms is in the form of a semi-circle so that when the two sections are assembled together a substantially circular opening is inclosed thereby. A groove B, parallel with the long arm, is formed in the end of each of the short arms and each of the long arms is provided with a tongue C which lies within the adjacent groove. Each of the tongues is provided with an elongated slot $c$ extending substantially parallel with the arm to which the tongue is attached. Pins $b$, preferably but not necessarily square or rectangular in cross-section, pass through the slot $c$ and have their ends secured within the walls bounding the grooves B. It will thus be seen that the two sections are secured-together by means of pins and slots which afford a capacity for limited relative movements. The outer ends of the tongues C are preferably extended laterally as at $c'$ so as to overlie the bottom walls of enlarged portions $b'$ of the grooves.

D, D are springs each of which is arranged between one of the extensions or ears $c'$ and the bottom wall of the adjacent groove, each of the springs preferably resting in a socket $a^3$ whereby it is held in position. The springs are preferably of such lengths that when the sections are assembled, the springs must be placed under tension before the pins can be inserted, the springs of course being under least tension when the pins lie at the inner ends of the slots. The parts are so proportioned, however, that the opening in the guard is of substantially the desired size when the pins lie in the outer ends of the slots. Therefore, after the guard has been put in place upon an axle or shaft, the sections are yieldingly pressed against the axle or shaft and, as wear occurs, are fed inwardly until the pins strike the walls bounding the inner ends of the slots.

Projecting inwardly near the outer extremity of each of the slots is a short branch $c^2$ which affords a shoulder upon which the corresponding pin may rest when it is carried adjacent to that end of the slot and then moved laterally.

Assuming that the pins lie within the inner ends of the slots: then, when the workman desires to place a guard in position, he takes hold of the short arm of each section and draws the sections apart. As soon as the pins reach the far end of the slots a relative lateral movement takes place between the sections, the pins become seated within the branches $c^2$, and the sections will be maintained in this position against the tension of the springs until something further is done. The result of the lateral shifting of the sections is to displace the centers of the two halves of the opening along the common diameter, namely in the direction at right angles to the long arms of the sections. When the axle E is inserted into the slightly irregular opening thus formed it bears against each of the sections at one point only, namely near the outer end of the short arm thereof. As a result the two sections are drawn together and the pins are unseated and enter into the main portions of the slots. The springs then immediately act and force the sections together in the direction at right angles to this preliminary movement so that a complete bearing is formed around the entire shaft or axle. Furthermore, as wear takes place, the springs, which are always acting, gradually force the sections toward each other until the pins rest within the inner ends of the slots.

It will now be seen that I have provided an extremely simple guard which is automatically locked in extended condition when brought to that condition by a simple manipulation on the part of the workman and which will be automatically tripped or released upon the insertion of an axle or shaft so as to spring into engagement with the axle or shaft. Consequently the operation of applying the guard is extremely simple and there is no danger, after the guard has been applied, that the workman has left the guard locked in such condition that it will partially or wholly fail to perform its intended function. Furthermore the guard is made of a few simple pieces and can therefore be manufactured very cheaply.

As I have already stated, it is not my desire to be limited to the particular construction and arrangement illustrated since in its broader aspects my invention may take various other forms as will be evident from the terms employed in the definitions of my invention constituting the appended claims.

Having now fully described my invention, what I claim as new and desire to secure by Letters Patent is:—

1. In a dust guard, a plurality of relatively-movable members, means tending to move said members toward a common center, and a catch device adapted to hold said members against movement through said means and arranged to be tripped by an axle upon insertion thereof through the guard.

2. In a dust guard, a plurality of relatively-movable members grouped so as to leave a central opening, means tending to yieldingly hold said members in such positions as to make said opening of a minimum size, and a catch device associated with said members for holding them in positions making said opening larger than said minimum size and arranged to be tripped by an axle upon the insertion thereof through said opening.

3. In a dust guard, a plurality of relatively-movable members arranged to surround and closely fit an axle, a spring tending to move said members inwardly so as to reduce the size of the opening inclosed thereby, and means for automatically locking said members against the tension of said spring when said members are moved so as to make the said opening of a predetermined size.

4. In a dust guard, a plurality of relatively-movable members arranged to surround and closely fit an axle, a spring tending to move said members inwardly so as to reduce the size of the opening inclosed thereby, and means arranged to be tripped upon the insertion of an axle into said opening for automatically locking said members against the tension of said spring when said members are moved so as to make the said opening of a predetermined size.

5. In a dust guard, a pair of relatively-movable members, one of said members having a slot therein and the other having a pin passing through said slot, a spring between said members tending to hold them in the position wherein said pin lies at one end of the slot, and there being a lateral branch extending from said slot at the opposite end thereof.

6. In a dust guard, a pair of relatively-movable interlocking members, one of the interlocking portions being provided with an elongated slot and the other with a pin entering into said slot, a spring tending to hold said members so as to maintain said pin at a predetermined point in said slot, and said slot having a lateral branch at a different point.

7. In a dust guard, a pair of relatively-movable members shaped so as to form a central opening, there being a slot in one member and a pin lying in the slot and carried by the other member, a spring tending to hold said members in the position wherein said opening is of minimum size, and there being a short lateral branch from said slot at a point opposite the pins when the members are occupying a position wherein said opening is larger than said minimum size.

8. In a dust guard, a pair of members shaped so as to form a central circular opening one half of which is in one member and the other half in the other member, one of said members having a slot extending in a direction transverse to the diameter common to said halves of said opening and the other member having a pin lying in said slot, a spring device tending to hold said members in a position to reduce the size of said opening, and there being a short lateral branch from said slot in a position to receive said pin and cause the centers of the said halves of the opening to be displaced from each other along said diameter.

9. In a dust guard, a pair of members shaped so as to form a central circular opening one half of which is in one member and the other half in the other member, connecting means for said members comprising an L-shaped slot and a pin at each of two diagonally-opposed corners of said guard, and springs tending to hold said members in a position to form a minimum central opening.

In testimony whereof, I sign this specification in the presence of two witnesses.

GEORGE L. MANSFIELD.

Witnesses:
WM. F. FREUDENREICH,
HARRY S. GAITHER.